US009721007B2

(12) United States Patent
Zhang et al.

(10) Patent No.: US 9,721,007 B2
(45) Date of Patent: Aug. 1, 2017

(54) PARALLEL DATA SORTING

(71) Applicant: Oracle International Corporation, Redwood Shores, CA (US)

(72) Inventors: Haowei Zhang, Redwood Shores, CA (US); Xiaoying Shen, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 246 days.

(21) Appl. No.: 14/508,708

(22) Filed: Oct. 7, 2014

(65) Prior Publication Data

US 2016/0098481 A1 Apr. 7, 2016

(51) Int. Cl.
*G06F 17/30* (2006.01)
*G06F 7/32* (2006.01)

(52) U.S. Cl.
CPC ......... *G06F 17/30705* (2013.01); *G06F 7/32* (2013.01); *G06F 17/30312* (2013.01); *G06F 17/30613* (2013.01); *G06F 17/30979* (2013.01)

(58) Field of Classification Search
CPC . G06F 17/30705; G06F 7/32; G06F 17/30979
See application file for complete search history.

(56) References Cited

U.S. PATENT DOCUMENTS

| 7,680,791 B2 | 3/2010 | Callaghan et al. |
| 8,468,166 B2 | 6/2013 | Bozkaya et al. |
| 2009/0106299 A1 | 4/2009 | Furusho |
| 2009/0171885 A1* | 7/2009 | Silberstein ........ G06F 17/30584 |
| 2014/0059052 A1 | 2/2014 | Yamamoto |

OTHER PUBLICATIONS

Varman et al., "Merging Multiple Lists on Hierarchical-Memory Multiprocessors", Journal of Parallel and Sistributed Computing, vol. 12, No. 2, dated Jun. 1991, 8 pages.
Sintorn et al., "Fast Parallel GPU-Sorting Using a Hybrid Algorithm", Journal of Parallel and Distributed Computing, vol. 68, No. Oct. 10, 2008, 8 pages.

(Continued)

*Primary Examiner* — Alexander Khong
(74) *Attorney, Agent, or Firm* — Hickman Palermo Becker Bingham LLP

(57) ABSTRACT

Techniques for high-performance parallel data sorting are provided. K, M, and N exceed 1. In a first phase, a plurality of unordered data elements to be sorted is divided into K unordered lists each preferably having approximately M elements. Each of these K unordered lists can be independently sorted in parallel using any algorithm, such as quicksort, to generate K ordered lists. In a second phase, N balanced workloads are determined from the K ordered lists by using an iterative converging process capped by a maximum number of iterations. Thus, any non-uniform or skewed data distribution can be load balanced with minimal processing time. Once the N balanced workloads are determined, they can be independently sorted in parallel, for example by using a merge sort, and then combined with a fast concatenation to provide the final sorted result. Thus, sorting operations are fully parallelized while avoiding expensive data scanning steps.

20 Claims, 9 Drawing Sheets

(56) References Cited

OTHER PUBLICATIONS

Rhys Francis et al., "A Fast, Simple Algorithm to Balance a Parallel Multiway Merge", dated Jun. 14, 1993, 12 pages.
Lee et al., "Partitioned Parallel Radix Sort" Journal of Parallel and Distributed Computing, dated 2002, 13 pages.
Bader, David, "An improved, randomized algorithm for parallel selection with an experimental study", Journal of Parallel and Distributed Computing, dated Jun. 24, 2004, 9 pages.
Oracle Database, "SQL Language Reference 12c Release", dated Dec. 2014, 1906 pages.

* cited by examiner

FIG. 2A

202
RECEIVE K ORDERED LISTS, WHEREIN M REPRESENTS A NUMBER OF ELEMENTS IN EACH OF THE K ORDERED LISTS

204
DEFINE, FOR N BALANCED WORKLOADS, A TARGET SIZE RANGE THAT DOES NOT EXCEED A PREDETERMINED THRESHOLD FROM A TARGET SIZE OF KM/N

206
DETERMINE THE N BALANCED WORKLOADS AS INCLUDING, FROM EACH OF THE K ORDERED LISTS, A SUBSET THAT IS BOUNDED BY A PARTICULAR INDEX RANGE, WHEREIN THE DETERMINING ADJUSTS, UP TO A MAXIMUM NUMBER OF ITERATIONS, THE PARTICULAR INDEX RANGE FOR EACH SAID SUBSET TO CONVERGE A SIZE OF EACH SAID N BALANCED WORKLOADS TOWARDS THE TARGET SIZE RANGE

208
SORT EACH OF THE N BALANCED WORKLOADS IN PARALLEL

210
COMBINE THE N BALANCED WORKLOADS TO OUTPUT A SORTED RESULT

UNSORTED DATA ELEMENTS 160

Normal distribution of T = 64 elements, mean = 40, standard deviation = 20:

{37, 18, 53, 18, 40, 54, 40, 29, 49, 44, 82, 47, 60, 55, 37, 33,
26, 66, 21, 13, 24, 29, 0, 41, 22, 39, 36, 26, 38, 57, 47, 25,
68, 56, 33, 53, 64, 40, 34, 63, 13, 37, 30, 41, 73, 39, 31, 33,
27, 8, 20, 55, 62, 13, 20, 71, 43, 36, 68, 0, 51, 39, 50, 16}

↓

SPLIT 151
K = 4

↓

UNORDERED LISTS 161
K = 4, M = 16

List 1: {37, 18, 53, 18, 40, 54, 40, 29, 49, 44, 82, 47, 60, 55, 37, 33}

List 2: {26, 66, 21, 13, 24, 29, 0, 41, 22, 39, 36, 26, 38, 57, 47, 25}

List 3: {68, 56, 33, 53, 64, 40, 34, 63, 13, 37, 30, 41, 73, 39, 31, 33}

List 4: {27, 8, 20, 55, 62, 13, 20, 71, 43, 36, 68, 0, 51, 39, 50, 16}

↓

PARALLEL SORT 152

↓

ORDERED LISTS 162
K = 4, M = 16

List 1: {18, 18, 29, 33, 37, 37, 40, 40, 44, 47, 49, 53, 54, 55, 60, 82}

List 2: {0, 13, 21, 22, 24, 25, 26, 26, 29, 36, 38, 39, 41, 47, 57, 66}

List 3: {13, 30, 31, 33, 33, 34, 37, 39, 40, 41, 53, 56, 63, 64, 68, 73}

List 4: {0, 8, 13, 16, 20, 20, 27, 36, 39, 43, 50, 51, 55, 62, 68, 71}

FIG. 2D

SPLIT POINT ITERATION 155A

- Select a particular List 4 with index M/N (16/4 = 4) as the candidate split point
- Candidate split for List 4 is index 4 with a value of 20, use it to find other splits.

List 1: {18, 18, | 29, 33, 37, 37, 40, 40, 44, 47, 49, 53, 54, 55, 60, 82}
List 2: {0, 13, | 21, 22, 24, 25, 26, 26, 29, 36, 38, 39, 41, 47, 57, 66}
List 3: {13, | 30, 31, 33, 33, 34, 37, 39, 40, 41, 53, 56, 63, 64, 68, 73}
List 4: {0, 8, 13, 16, | 20, 20, 27, 36, 39, 43, 50, 51, 55, 62, 68, 71}

- Determine Current Size = 9   (2 + 2 + 1 + 4)
- Continue iterating since the Current Size exceeds the Target Size Range [14, 18]

SPLIT POINT ITERATION 155B

- Since the Current Size is smaller, converge towards a larger workload by selecting the smallest list (List 3) and adjusting the split index upwards using $i = \lceil(i + M/N) / 2\rceil$. In this case, $i = \lceil(1 + 16/4) / 2\rceil = \lceil 5 / 2 \rceil = \lceil 2.5 \rceil = 3$.
- Candidate split for List 3 is index 3 with a value of 33, use it to adjust other splits.

List 1: {18, 18, 29, | 33, 37, 37, 40, 40, 44, 47, 49, 53, 54, 55, 60, 82}
List 2: {0, 13, 21, 22, 24, 25, 26, 26, 29, | 36, 38, 39, 41, 47, 57, 66}
List 3: {13, 30, 31, | 33, 33, 34, 37, 39, 40, 41, 53, 56, 63, 64, 68, 73}
List 4: {0, 8, 13, 16, 20, 20, 27, | 36, 39, 43, 50, 51, 55, 62, 68, 71}

- Determine Current Size = 22   (3 + 9 + 3 + 7)
- Continue iterating since the Current Size exceeds the Target Size Range [14, 18]

SPLIT POINT ITERATION 155C

- Since the Current Size is larger, converge towards a smaller workload by selecting the largest list (List 2) and adjusting the split index downwards using $i = \lceil(i + M/N) / 2\rceil$. In this case, $i = \lceil(9 + 16/4) / 2\rceil = \lceil 13 / 2 \rceil = \lceil 6.5 \rceil = 7$.
- Candidate split for List 2 is index 7 with a value of 26, use it to adjust other splits.

List 1: {18, 18, | 29, 33, 37, 37, 40, 40, 44, 47, 49, 53, 54, 55, 60, 82}
List 2: {0, 13, 21, 22, 24, 25, 26, | 26, 29, 36, 38, 39, 41, 47, 57, 66}
List 3: {13, | 30, 31, 33, 33, 34, 37, 39, 40, 41, 53, 56, 63, 64, 68, 73}
List 4: {0, 8, 13, 16, 20, 20, | 27, 36, 39, 43, 50, 51, 55, 62, 68, 71}

- Determine Current Size = 16   (2 + 7 + 1 + 6)
- Stop iterating since the Current Size is within the Target Size Range [14. 18]

FIG. 2E

SPLIT POINT ITERATION 155D

- Select a particular List 4 with index M/N (16/4 = 4) as the candidate split point
- Candidate split for List 4 is index 4 with a value of 50, use it to find other splits.

List 1: {29, 33, 37, 37, 40, 40, 44, 47, 49, | 53, 54, 55, 60, 82}
List 2: {26, 29, 36, 38, 39, 41, 47, | 57, 66}
List 3: {30, 31, 33, 33, 34, 37, 39, 40, 41, | 53, 56, 63, 64, 68, 73}
List 4: {27, 36, 39, 43, | 50, 51, 55, 62, 68, 71}

- Determine Current Size = 29    (9 + 7 + 9 + 4)
- Continue iterating since the Current Size exceeds the Target Size Range [14, 18]

SPLIT POINT ITERATION 155E

- Since the Current Size is larger, converge towards a smaller workload by selecting the largest list (List 1) and adjusting the split index downwards using $i = \lceil (i + M/N) / 2 \rceil$. In this case, $i = \lceil (9 + 16/4) / 2 \rceil = \lceil 13 / 2 \rceil = \lceil 6.5 \rceil = 7$.
- Candidate split for List 1 is index 7 with a value of 47, use it to adjust other splits.

List 1: {29,  33, 37, 37, 40, 40, 44, | 47, 49, 53, 54, 55, 60, 82}
List 2: {26, 29, 36, 38,  39,  41, | 47, 57, 66}
List 3: {30, 31, 33, 33, 34, 37, 39, 40, 41, | 53, 56, 63, 64, 68, 73}
List 4: {27, 36, 39, 43, | 50, 51, 55, 62, 68, 71}

- Determine Current Size = 26    (7 + 6 + 9 + 4)
- Continue iterating since the Current Size exceeds the Target Size Range [14, 18]

SPLIT POINT ITERATION 155F

- Since the Current Size is larger, converge towards a smaller workload by selecting the largest list (List 3) and adjusting the split index downwards using $i = \lceil (i + M/N) / 2 \rceil$. In this case, $i = \lceil (9 + 16/4) / 2 \rceil = \lceil 13 / 2 \rceil = \lceil 6.5 \rceil = 7$.
- Candidate split for List 3 is index 7 with a value of 40, use it to adjust other splits.

List 1: {29, 33, 37, 37, | 40, 40, 44, 47, 49, 53, 54, 55, 60, 82}
List 2: {26, 29, 36, 38, 39, | 41, 47, 57, 66}
List 3: {30, 31, 33, 33, 34, 37, 39, | 40, 41, 53, 56, 63, 64, 68, 73}
List 4: {27, 36, 39, | 43, 50, 51, 55, 62, 68, 71}

- Determine Current Size = 19    (4 + 5 + 7 + 3)
- Stop iterating since the maximum number of iterations (3) has been reached

SPLIT POINT ITERATION 155G

- Select a particular List 4 with index M/N (16/4 = 4) as the candidate split point
- Candidate split for List 4 is index 4 with a value of 62, use it to find other splits.

List 1: {40, 40, 44, 47, 49, 53, 54, 55, 60, | 82}
List 2: {41, 47, 57, | 66}
List 3: {40, 41, 53, 56, | 63, 64, 68, 73}
List 4: {43, 50, 51, 55, | 62, 68, 71}

- Determine Current Size = 20    (9 + 3 + 4 + 4)
- Continue iterating since the Current Size exceeds the Target Size Range [14, 18]

---

SPLIT POINT ITERATION 155H

- Since the Current Size is larger, converge towards a smaller workload by selecting the largest list (List 1) and adjusting the split index downwards using i = ⌈(i + M/N) / 2⌉. In this case, i = ⌈(9 + 16/4) / 2⌉ = ⌈13 / 2⌉ = ⌈6.5⌉ = 7.
- Candidate split for List 1 is index 7 with a value of 55, use it to adjust other splits.

List 1: {40, 40, 44, 47, 49, 53, 54, | 55, 60, 82}
List 2: {41, 47, | 57, 66}
List 3: {40, 41, 53, | 56, 63, 64, 68, 73}
List 4: {43, 50, 51, | 55, 62, 68, 71}

- Determine Current Size = 15    (7 + 2 + 3 + 3)
- Stop iterating since the Current Size is within the Target Size Range [14, 18]

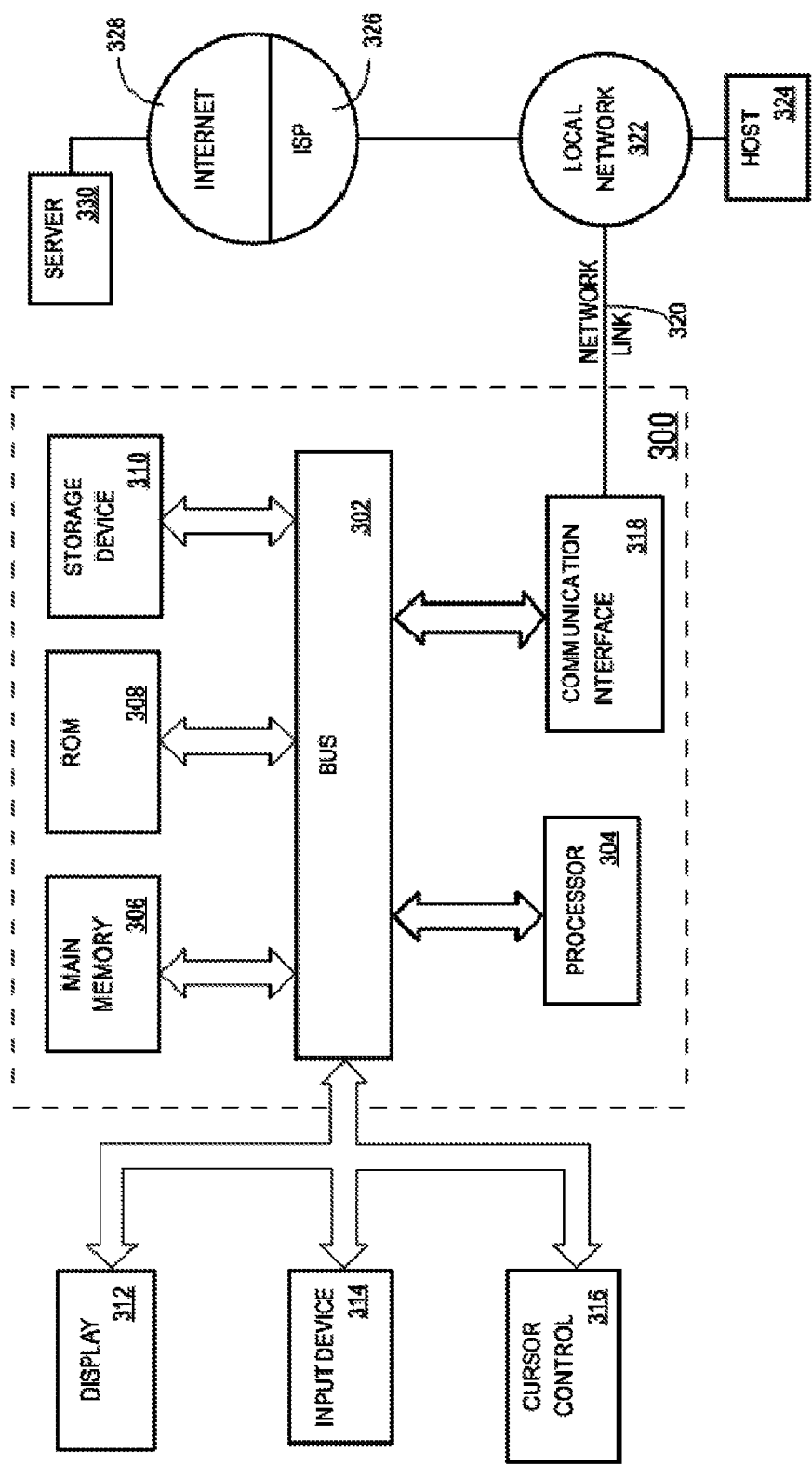

PARALLEL DATA SORTING

FIELD OF THE INVENTION

The present disclosure relates to data sorting, and more specifically, to improved, high-performance parallel data sorting suited to multi-threaded and multi-node environments.

BACKGROUND

Sorting data is a classic optimization problem with practical application in a wide variety of academic and industrial fields. Computer applications may require high-performance sorting methods to conduct business intelligence analytics, to provide presentation rendering, to respond to external requests from users and applications, and for other tasks. For example, a database may be queried for a list of records that is sorted according to user or application defined criteria. Since the overall processing time to answer these queries is directly impacted by the sort execution time, a high performance sort is needed to provide results in a timely manner. Sort performance is especially important for applications working with big data sets such as database management systems (DBMSs) for large enterprises or high-performance computing (HPC), as the large number of data records may magnify the execution time of any sorting operation.

Multi-threaded processing may be utilized to provide suitable response times for these data intensive applications, wherein resources such as processor cores and/or processing nodes are added according to the data processing workload. With a highly parallelizable workload, multi-threaded processing has the potential to provide optimized performance scaling in a cost efficient and practical manner. Since sorting may contribute a large proportion of the data processing workload, sorting becomes a prime target for parallelization to reduce query latency times and to improve data processing throughput in multi-threaded environments.

Serial sorting techniques such as quicksort are readily available, providing sufficient performance for applications with low to moderate data processing needs. However, these serial sorting methods are less applicable for multi-threaded applications with high data processing needs. While various approaches for parallelizing serial sorting methods have been suggested, these approaches may break down when attempting to process a large number of elements that need to be sorted in a data intensive application, which may number in the billions or more, or when attempting to distribute the workload to a large number of parallel processing threads in a highly multi-threaded environment, which may number in the hundreds or more.

Furthermore, a given data set to be analyzed may include any kind of data distribution, and thus a sort must be able to process a data set regardless of its particular data distribution. Any parallelization approach that requires a lengthy pre or post-processing step to cope with non-uniform data distributions may impose an unacceptable performance penalty by reducing or negating performance gains obtained from parallelization. For example, while radix-sort may be amenable to parallelization as each partition can be independently sorted, the partitioning of data according to most significant bits provides poor workload balancing for non-uniform or skewed data distributions. Thus, a computationally expensive pre-processing step is required for radix-sort to cope with non-uniform data distributions, for example by conducting a serial data scan to determine balanced workload partitions. While a parallel data scan is also possible, this would impose significant processing overhead due to the inter-process communication required to resolve write contention, which only grows worse as the number of threads increases. In either case, the performance penalty from the pre-processing step may outweigh any performance gains from parallelizing the radix-sort.

Based on the foregoing, there is a need for a method to provide high-performance parallel data sorting suited to multi-threaded and multi-node environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram that depicts a process for improved parallel data sorting, according to an embodiment;

FIG. 2B is a block diagram that depicts a process for receiving K ordered lists each preferably including approximately M elements, according to an embodiment;

FIG. 2D, FIG. 2E, and FIG. 2F are block diagrams that depict a process for converging a particular workload towards a balanced target size range by iteratively adjusting index splits for the K ordered lists, according to an embodiment;

FIG. 3 is a block diagram of a computer system on which embodiments may be implemented.

DETAILED DESCRIPTION

Figure 1:
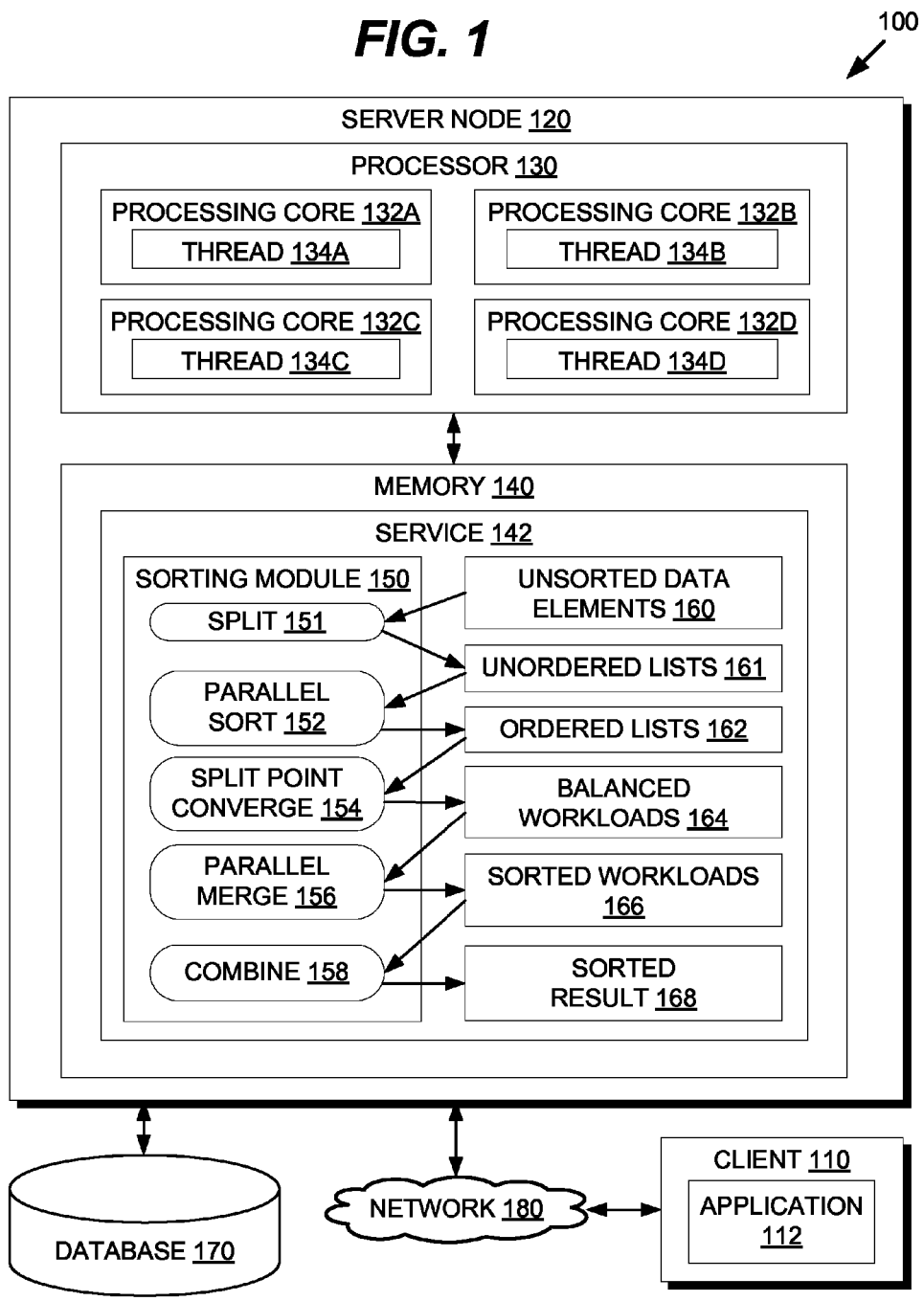
FIG. 1 is a block diagram that depicts an example system for improved parallel data sorting, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an improved method for high-performance parallel data sorting is provided. In a first phase, a plurality of unordered data elements to be sorted is divided into K unordered lists each preferably having approximately M elements. Each of these K unordered lists can be independently sorted in parallel using any suitable algorithm, such as quicksort, to generate K ordered lists.

In a second phase, N balanced workloads are determined from the K ordered lists received from the first phase. Each of the N balanced workloads is bounded by a particular range of values from the K ordered lists, allowing each of the N balanced workloads to be fully sorted in parallel and quickly concatenated at a final combining step. To determine the particular range of values or the index splits for a particular workload, candidate index splits are chosen and refined up to a maximum number of iterations such that a size of the particular workload converges towards a balanced workload size, or 1/N of the K ordered lists. In this manner, the N balanced workloads can be quickly determined without scanning the actual data. Once the N balanced workloads are determined, they can be independently sorted in parallel, for example by using a K-way merge sort. These sorted workloads can then be combined to provide the final sorted result.

This improved high-performance parallel data sorting method provides several technical advantages to achieve higher performance in highly multi-threaded and multi-core environments. First, since the parallel sorting at each phase proceeds independently, no inter-process communication is required, greatly simplifying implementation and eliminating expensive overhead. Second, since N balanced workloads are determined, load balancing for N threads is optimized regardless of the particular data distribution of the elements to be sorted. Third, because the index splits of the N balanced workloads are determined by iteratively converging towards a balanced size, no expensive data scan steps are required. Accordingly, this improved high-performance parallel data sorting method has particular relevance for applications that need to process big data sets, numbering in the billions of elements or more, on hardware with many parallel processing units, numbering in the hundreds or more.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Improved Parallel Sorting System Overview

FIG. 1 is a block diagram that depicts an example system for improved parallel data sorting, according to an embodiment. System 100 of FIG. 1 includes client 110, server node 120, database 170, and network 180. Client 110 includes application 112. Server node 120 includes processor 130 and memory 140. Processor 130 includes processing core 132A, processing core 132B, processing core 132C, and processing core 132D. Processing core 132A includes thread 134A, processing core 132B includes thread 134B, processing core 132C includes thread 134C, and processing core 132D includes thread 134D. Memory 140 includes service 142. Service 142 includes sorting module 150, unsorted data elements 160, unordered lists 161, ordered lists 162, balanced workloads 164, sorted workloads 166, and sorted result 168. Sorting module 150 includes split 151, parallel sort 152, split point converge 154, parallel merge 156, and combine 158.

To support data intensive applications with large numbers of records and transactions, server node 120 utilizes a multi-core architecture to execute multiple threads concurrently, thereby reducing latency times and increasing data processing throughput. While only a single processor 130 and four processing cores 132A-132D are shown in FIG. 1, embodiments may include any number of processors and processing cores, numbering in the hundreds or more. Processing cores 132A-132D may be independent physical or logical cores that are capable of executing respective threads 134A-134D concurrently. Additionally, while only a single server node 120 and a single client 110 are shown in FIG. 1, embodiments may include multiple server nodes and/or multiple clients. Further, while system 100 is shown in the context of networked client-server architecture, system 100 may be flexibly configured according to specific application requirements. For example, in the context of system-on-a-chip or embedded applications, client 110 and server node 120 may be combined into a single monolithic device.

In an embodiment, system 100 may be used in the context of databases. However, system 100 is not necessarily limited to database contexts and service 142 may correspond to any application or service that requires data to be sorted. In the context of databases, server node 120 may correspond to a database server with service 142 corresponding to a DBMS for database 170, enabling client applications such as application 112 to interact with database 170. Accordingly, application 112 may send a database query to service 142 over network 180, wherein the database query requests records that are sorted according to certain criteria. In an embodiment, this database query may correspond to a SQL SELECT query that includes an ORDER BY clause.

When service 142 receives the database query from application 112, service 142 may retrieve the requested database records of the SELECT query from database 170, which are then stored in memory 140 as a list of unsorted records, or unsorted data elements 160. Unsorted data elements 160 may contain a large number of elements, for example billions or more. For simplicity, it may be assumed that memory 140 is large enough to avoid any I/O overhead from swapping to disk.

Service 142 may utilize sorting module 150 to sort unsorted data elements 160 according to the criteria in the database query, or the ORDER BY clause, to generate sorted result 168. As shown in sorting module 150, various processing steps are carried out to convert unsorted data elements 160 into sorted result 168, as described below in conjunction with FIG. 2A. Note that while each processing step of sorting module 150 may appear to create a new data element in memory 140, embodiments may create or modify structures such as pointers, linked lists, or other data structures as appropriate to avoid expensive memory copy operations.

To accelerate sorting module 150, parallel sort 152 and parallel merge 156 utilize multiple threads concurrently, or threads 134A-134D in FIG. 1. Each of these threads operates on independent portions of data in memory 140, bypassing concurrency issues such as write contention and overhead from inter-process communication. In embodiments with multiple nodes, sorting module 150 may distribute parallel processing steps and associated data to threads on remote nodes (not shown in FIG. 1) via network 180. The remote nodes may correspond to multi-core server nodes similar to server node 120. Once sorted result 168 is available, it may be returned to application 112 via network 180 to respond to the original database query.

Improved Parallel Sorting Process

With a basic outline of system 100 now in place, it may be instructive to review a high level overview of the processing steps carried out by sorting module 150. Turning to FIG. 2A, FIG. 2A is a block diagram that depicts a process for improved parallel data sorting, according to an embodiment.

Receiving K Ordered Lists

At block 202 of process 200, referring to FIG. 1, server node 120 receives K ordered lists, or ordered lists 162, wherein M represents a number of elements in each of the ordered lists 162. In other words, the ordered lists 162 should be preferably balanced in size, with each of the K ordered lists including approximately M elements. However, in some embodiments, one or more lists of ordered lists 162 may include a number of elements that deviates from M to some extent.

Block 202 may correspond to a first phase of process 200. In some embodiments, ordered lists 162 may be provided by a program or service other than service 142. For example, a program from a different server node may send an external sort request with ordered lists 162 over network 180. In another embodiment, server node 120 may create ordered lists 162 in response to a request from service 142 to sort unsorted data elements 160. In this case, the receiving of ordered lists 162 will be from transforming unsorted data elements 160, as illustrated in FIG. 1 and FIG. 2B.

Referring to FIG. 2B, FIG. 2B is a block diagram that depicts a process for receiving K ordered lists each preferably including approximately M elements, according to an embodiment. Process 222 of FIG. 2B includes split 151, parallel sort 152, unsorted data elements 160, unordered lists 161, and ordered lists 162. Process 222 may correspond to block 202 from FIG. 2A. With respect to FIG. 2B, numbered elements may correspond to like numbered elements from FIG. 1.

As shown in FIG. 2B, process 222 may begin by receiving unsorted data elements 160. For example, referring to FIG. 1, service 142 may populate unsorted data elements 160 with records retrieved from database 170 to answer a SQL SELECT query from application 112. Sorting module 150 may then receive a request from service 142 to receive and sort unsorted data elements 160 according to the GROUP BY clause in the SQL SELECT query.

For illustrative purposes, unsorted data elements 160 is populated with T=64 integer elements having a normal distribution with a mean of 40 and a standard deviation of 20. Thus, unsorted data elements 160 have a non-uniform distribution. However, unsorted data elements 160 may correspond to any number of elements T, such as billions or more elements, having any data distribution, including uniform, non-uniform, and highly skewed distributions. Furthermore, for simplicity, the elements in unsorted data elements 160 are integers to be sorted in ascending numerical order. However, embodiments may include elements as records to be sorted according to one or more sort keys, wherein each sort key can be in ascending or descending order.

Process 222 may utilize split 151 to divide unsorted data elements 160 approximately evenly into unordered lists 161. Referring to FIG. 1 and FIG. 2B, split 151 is configured with K=4 since there are 4 threads available for use at server node 120, or threads 134A-134D. Thus, unordered lists 161 include 4 lists each having M=T/K=64/4=16 elements. When T cannot be exactly evenly divided by K, each list in unordered lists 161 may include approximately M elements. Additionally, in some embodiments, split 151 may be configured to split only at particular split boundaries, such as between blocks of a fixed size that contain multiple elements, rather than splitting at the granularity of individual elements. In this case, unordered lists 161 may include lists having a number of elements that deviate from M.

As shown in FIG. 2B, each of lists 1-4 in unordered lists 161 directly corresponds to a contiguous segment of unsorted data elements 160. Accordingly, split 151 can avoid any computationally expensive data analysis steps by dividing unsorted data elements 160 directly into contiguous segments based on the number of elements (T) within unsorted data elements 160, the number of threads (K) available for use at server node 120, and any split boundaries, if applicable.

With unordered lists 161 now available, process 222 may continue with the step of parallel sort 152 to sort each of the unordered lists 161 in parallel. For example, referring to FIG. 1, each of threads 134A-134C may sort a respective list 1-4 of unordered lists 161 in parallel. Any sorting method may be utilized in parallel sort 152, such as quicksort. Since the lists in unordered lists 161 are roughly the same size with approximately M elements each, threads 134A-134D should complete closely in time to minimize any blocking from waiting for a particular thread to finish. After parallel sort 152 is finished, ordered lists 162 may be received, populated as shown in FIG. 2B. Of course, since ordered lists 162 are only sorted with respect to each individual list, further processing is needed to generate the final sorted result 168. Thus, process 200 may move from the first phase of block 202 to a second phase, beginning with block 204.

Defining a Target Size Range

At block 204 of process 200, referring to FIG. 1, server node 120 defines, for N balanced workloads 164, a target size range that does not exceed a predetermined threshold from a target size of KM/N. Since 4 threads are available, or threads 134A-134D, N is set to 4. Note that in this example K=N, since both parallel sort 152 and parallel merge 156 execute on the same 4 threads 134A-134D. Thus, the target size is KM/N=4(16)/4=16.

However, K does not necessarily need to equal N. K may not match N if the number of threads utilized is different between parallel sort 152 and parallel merge 156. For example, one or more threads 134A-134D might have been unavailable during parallel sort 152 but made available during parallel merge 156, leading to K<N. This may occur, for example, if one or more processing cores 132A-132D are busy during parallel sort 152, for example by executing threads from a different or higher priority process. In embodiments where ordered lists 162 is received from an external source, K may also differ from N since the external source may have used a different number of threads to create ordered lists 162. Regardless, both parallel sort 152 and parallel merge 156 operate as fully parallel steps, utilizing respectively K and N threads, which may or may not be the same number.

Since balanced workloads 164 are determined using split point converge 154, or a process that iteratively converges a workload size towards a balanced size, defining a target size range is useful to reduce processing time. More specifically, split point converge 154 may finish early if the workload size is within the target size range prior to a maximum allowable number of iterations. Thus, the predetermined threshold can be set larger to reduce the execution time of split point converge 154, or the predetermined threshold can be set smaller to reduce size variance in balanced workloads 164. The predetermined threshold may be set manually or automatically. For example, the predetermined threshold may be set by using a ratio, such as 50% of M/N, or 0.50(16/4)=2. Based on this predetermined threshold, the target size range includes sizes that do not exceed 2 from the target size 16, or [14, 18], which includes sizes 14 through 18 inclusive.

Determining Balanced Workloads

At block 206 of process 200, referring to FIG. 1, server node 120 determines the N balanced workloads 164 as including, from each of the K ordered lists 162, a subset that is bounded by a particular index range, wherein the determining adjusts, up to a maximum number of iterations, the particular index range for each said subset to converge a size of each said N balanced workloads 164 towards the target size range defined in block 204. In FIG. 1, block 206 corresponds to split point converge 154.

Figure 2C:
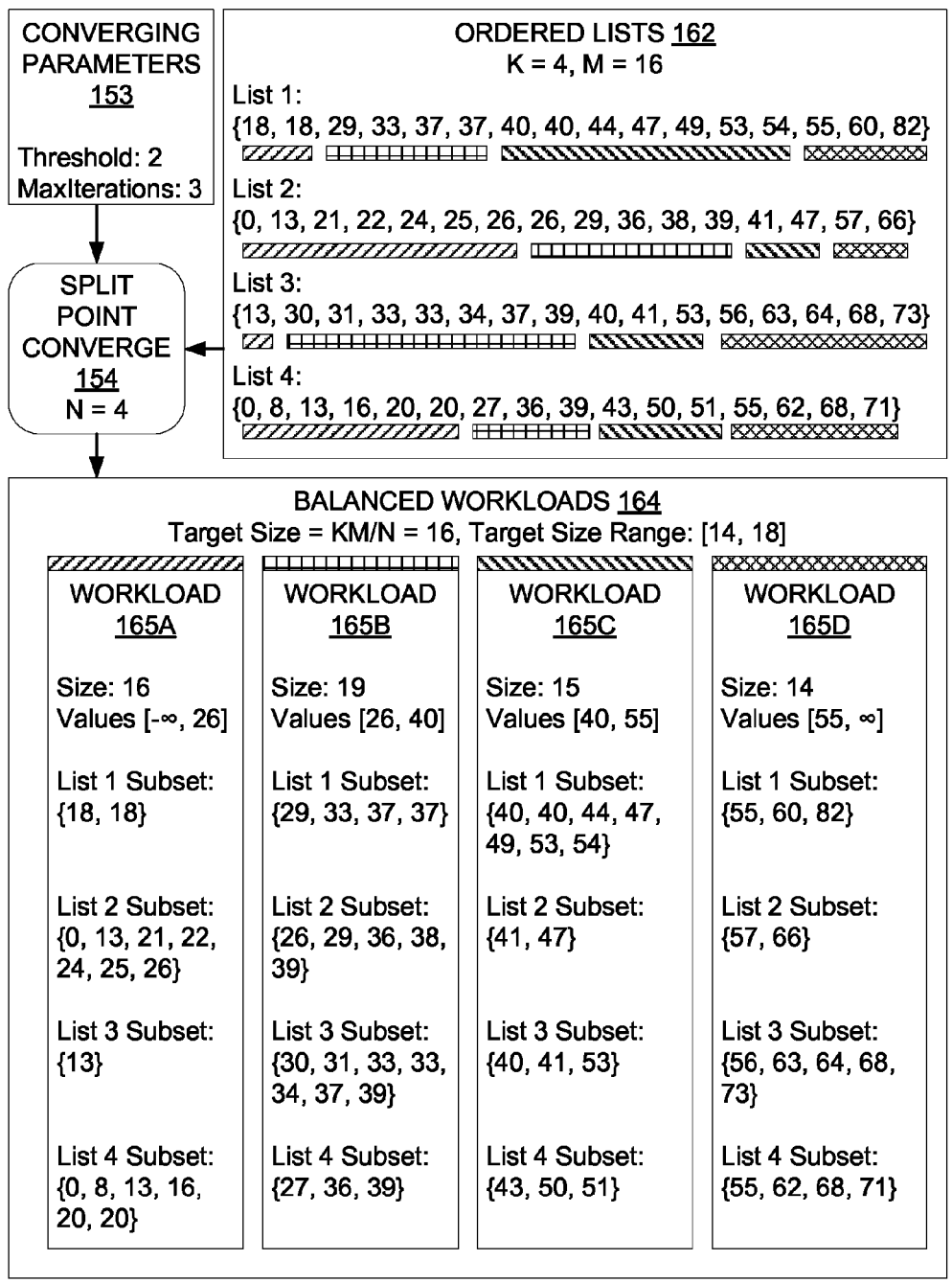
FIG. 2C is a block diagram that depicts a process for determining N balanced workloads from the K ordered lists of FIG. 2B, according to an embodiment.

Referring to FIG. 2C, FIG. 2C is a block diagram that depicts a process for determining N balanced workloads from the K ordered lists of FIG. 2B, according to an embodiment. Process 226 of FIG. 2C includes converging parameters 153, split point converge 154, ordered lists 162, and balanced workloads 164. Balanced workloads 164 includes workload 165A, workload 165B, workload 165C, and workload 165D. Process 226 may correspond to block 206 of FIG. 2A. With respect to FIG. 2C, numbered elements may correspond to like numbered elements from FIG. 1.

Converging parameters 153 specifies the parameters that are used by split point converge 154. As discussed with the example in conjunction with block 204, the predetermined Threshold value may be set to 2. Further, as discussed above, split point converge 154 may iterate for a maximum number of iterations MaxIterations=3. Similar to the Threshold value, the MaxIterations value may be set manually or automatically, with a larger number of iterations reducing size variance in balanced workloads 164 and a smaller number of iterations reducing the execution time of split point converge 154.

After executing split point converge 154, it can be seen that workload 165A includes 16 elements, workload 165B includes 19 elements, workload 165C includes 15 elements, and workload 165D includes 14 elements. Thus, each of workloads 165A-165D is balanced to include approximately M elements, or 16 elements. Further, as shown in FIG. 2C, each of workloads 165A-165D include a subset of values from each list 1-4 of ordered lists 162, which are bounded by particular index ranges as indicated by the shaded lines in FIG. 2C. The determination of these index ranges is described in further detail below in conjunction with FIG. 2D-2F, which respectively describe a process for converging workloads 165A-165C towards the target size range of [14, 18].

Iterative Split Point Converging

Before discussing the specific examples shown in FIG. 2D-2F, each iteration in split point converge 154 for a particular workload may be described using the following steps:

1. If the current iteration is the first iteration, then select a particular list from the ordered lists and select an element with the index M/N as the candidate split point. The particular list that is chosen is not vital; for simplicity the particular list is always selected to be the last list in the examples, or list 4.

2. If the current iteration is after the first iteration, then the candidate split point is adjusted from a previous split point based on the current size of the current workload (determined in step 4 below). If the current size is smaller than the target size range, then the particular list is the list with the smallest split point in the ordered lists. If the current size is larger than the target size range, then the particular list is the list with the largest split point in the ordered lists. Ties may be resolved by arbitrarily picking one of the tied lists. Set the candidate split point for the particular list by using the converging formula $i=\lceil(i+M/N)/2\rceil$, wherein the left side i corresponds to the index for the candidate split point and the right side i corresponds to the index for the previous split point in the particular list. Note that this converging formula is only one example; the converging formula may be adjusted to increase or decrease the distance moved for each converging step.

3. Find the split points for the other lists in the ordered lists based on the value at the candidate split point in the particular list. For example, the split point for the other lists may be chosen such that values prior to the split point do not exceed the candidate value at the candidate split point. In some embodiments, the values prior to the split point may include one or more values that equal the value at the candidate split point. This may provide some flexibility in adjusting the split points when a large amount of skew in the data results in a large number of identical values. Since the ordered lists are already sorted with respect to each ordered list, the split point may be quickly found in each of the other lists, for example by using a converging sampling algorithm or another method to avoid a full data scan. Furthermore, if the current iteration is after the first iteration, the last split point may be used as a starting reference point to find the current split point.

4. A current size of the current workload is determined by summing the number of elements prior to the split point (including the candidate split point) of each of the ordered lists. This current size is compared to the target size range. If the current size is within the target size range, then the converging process ends early. If the current iteration has reached the maximum number of iterations permissible or MaxIterations, then the converging process also ends early. In this case, if a large number of identical values are adjacent to one or more of the split points, then the split points may be adjusted accordingly to attempt to reach the target size range. If none of the above applies and the current iteration has not yet reached MaxIterations, then a new iteration begins with step 1 above.

5. After the above steps 1-4 have completed, a single set of split points for the sorted lists is now known, which also defines a particular index range for each of the list subsets that make up a particular workload, the particular index range starting from a beginning offset and not exceeding the split point. The beginning offset for each of the ordered lists may be initialized to zero (0) when determining the first workload. To determine the next set of split points, the beginning offset of each ordered list may be moved to the split point, and steps 1-4 as described above may be repeated to determine the next workload. This process may be repeated to determine all of the workloads, with the exception that the final workload simply corresponds to all of the elements from the beginning offset to a last element of each of the ordered lists after the penultimate workload (or N−1 workload) is determined.

Iterative Split Point Converging—First Workload

Having described the iterative split point converging process in general, it may be instructive to examine the process applied to specific example data. Turning to FIG. 2D, FIG. 2D, is a block diagram that depicts a process for converging a workload 165A towards the target size range [14, 18] by iteratively adjusting index splits for the K ordered lists, according to an embodiment. The first iteration begins with split point iteration 155A. As described above in step 1, the particular list is selected as the last list, or list 4, with the index M/N, or 16/4=4 as the candidate split point. Thus, the candidate split point is indicated in list 4 with the pipe or | symbol, just prior to the element at index 4 having a value of 20, indicated in bold in split point iteration 155A. Note that this example uses the convention wherein the first index is index 0; thus, index 4 actually refers to the 5$^{th}$ element.

Since split point iteration 155A is the first iteration, step 2 is skipped and step 3 begins. In step 3, the split points are found for all other lists, or list 1, list 2, and list 3. Since the candidate split point has a candidate value of 20, the split points are chosen such that values prior to the split points do not exceed 20. Thus, as shown in split point iteration 155A, the split point for list 1 is prior to index 2 (18≤20), the split point for list 2 is prior to index 2 (13≤20), and the split point for list 3 is prior to index 1 (13≤20). These split points are indicated by the | or pipe symbol in lists 1, 2 and 3, with the largest values not exceeding 20 indicated in bold.

A current size of workload 165A is determined by summing the number of elements prior to the split point of each of the ordered lists. Thus, the current size of workload 165A is 2+2+1+4=9. This current size is compared to the target size range [14, 18]. Since the current size is smaller than the target size range, the converging process continues to the next iteration.

The second iteration begins with split point iteration 155B. Starting with step 2, since the current size is smaller than the target size range, the particular list is the list with the smallest split point, or list 3 with a split point at index 1. Thus, the candidate split point for list 3 is set using the converging formula i=⌈(i+M/N)/2⌉ or i=⌈(1+16/4)/2⌉=⌈5/2⌉=⌈2.5⌉=3. This moves the split point for list 3 forward from index 1 to index 3 having a value of 33, indicated in bold in split point iteration 155B.

Next, in step 3, the split points are found for all other lists, or list 1, list 2, and list 4. Since the candidate split point has a value of 33, the split points are chosen such that values prior to the split points do not exceed 33. Thus, as shown in split point iteration 155B, the split point for list 1 is prior to index 3 (29≤33), the split point for list 2 is prior to index 9 (29≤33), and the split point for list 4 is prior to index 7 (27≤33). These split points are indicated by the | or pipe symbol in lists 1, 2 and 4, with the largest values not exceeding 33 indicated in bold.

A current size of workload 165A is determined by summing the number of elements prior to the split point of each of the ordered lists. Thus, the current size of workload 165A is 3+9+3+7=22. This current size is compared to the target size range [14, 18]. Since the current size is larger than the target size range, the converging process continues to the next iteration.

The third iteration begins with split point iteration 155C. Starting with step 2, since the current size is larger than the target size range, the particular list is the list with the largest split point, or list 2 with a split point at index 9. Thus, the candidate split point for list 2 is set using the converging formula i=⌈(i+M/N)/2⌉ or i=⌈(9+16/4)/2⌉=⌈13/2⌉=⌈6.5⌉=7. This moves the split point for list 3 backwards from index 9 to index 7 having a value of 26, indicated in bold in split point iteration 155C.

Next, in step 3, the split points are found for all other lists, or list 1, list 3, and list 4. Since the candidate split point has a value of 26, the split points are chosen such that values prior to the split points do not exceed 26. Thus, as shown in split point iteration 155C, the split point for list 1 is prior to index 2 (18≤26), the split point for list 3 is prior to index 1 (13≤26), and the split point for list 4 is prior to index 6 (20≤26). These split points are indicated by the | or pipe symbol in lists 1, 3 and 4, with the largest values not exceeding 26 indicated in bold. Note that in the case of list 2, the values prior to the split point include a value equal to the split point, or 26.

A current size of workload 165A is determined by summing the number of elements prior to the split point of each of the ordered lists. Thus, the current size of workload 165A is 2+7+1+6=16. This current size is compared to the target size range [14, 18]. Since the current size is within the target size range, the converging process finishes. However, even if the current size was outside the target size range, the converging process would still finish since the maximum number of iterations has been reached (MaxIterations=3).

With the first set of split points now known as indicated in split point iteration 155C, the contents of workload 165A can be defined from subsets of each of ordered lists 162, wherein the subsets have index ranges starting from the beginning offset up to the split point of each list. Since workload 165A is the first workload, the beginning offset is 0 for each list. Thus, workload 165A is populated as shown in FIG. 2C, with list 1 subset having an index range of 0 to 1 inclusive (2 elements), list 2 subset having an index range of 0 to 6 inclusive (7 elements), list 3 subset having an index range of 0 to 0 inclusive (1 element), and list 4 subset having an index range of 0 to 5 inclusive (6 elements). Since the workload 165A is the first workload, there is no lower bound to the possible values, but the upper bound is 26, or the value of the final split point candidate at list 2, or index 7. Thus, the range of possible values in workload 165A is indicated by [−∞, 26].

Iterative Split Point Converging—Successive Workloads

As discussed above, once steps 1-4 have been completed for a particular workload, step 5 may be carried out to continue with the next workload. Accordingly, the beginning offset of each sorted list is moved forward to the split point of each sorted list. Thus, the beginning offsets of lists 1-4 are set to 2, 7, 1, and 6, respectively. This is shown in split point iteration 155D of FIG. 2E, wherein list 1 now starts at index 2 with a value of 29, list 2 now starts at index 7 with a value of 26, list 3 now starts at index 1 with a value of 30, and list 4 now starts at index 6 with a value of 27. Accordingly, the completed workload is removed from consideration when determining the next set of split points.

The above process of steps 1-4 as described with workload 165A is carried out for workload 165B, as shown in split point iteration 155D, split point iteration 155E, and split point iteration 155F of FIG. 2E. For brevity, a full discussion of each iteration step is omitted. In this example, the current size never reaches the target size range of [14, 18], but the process nevertheless ends after 3 iterations in accordance with MaxIterations. The range of possible values in workload 165B is indicated by [26, 40]. Step 5 is again applied to move the beginning offsets forward to the second set of split points, and the process is repeated for workload 165C.

As shown in FIG. 2F, workload 165C is determined after only two iterations, or split point iteration 155G and split point iteration 155H. The range of possible values in workload 165C is indicated by [40, 55]. Since workload 165C is the penultimate workload, workload 165D is simply the leftover elements after the split points in split point iteration 155H. The range of possible values in workload 165D is indicated by [55, ∞], since workload 165D is the final workload with no upper bound of values. Accordingly, all of the workloads 165A-165D in balanced workloads 164 have been determined, thereby completing block 206 in process 200 of FIG. 2A.

Merging the Balanced Workloads

Figure 2G:
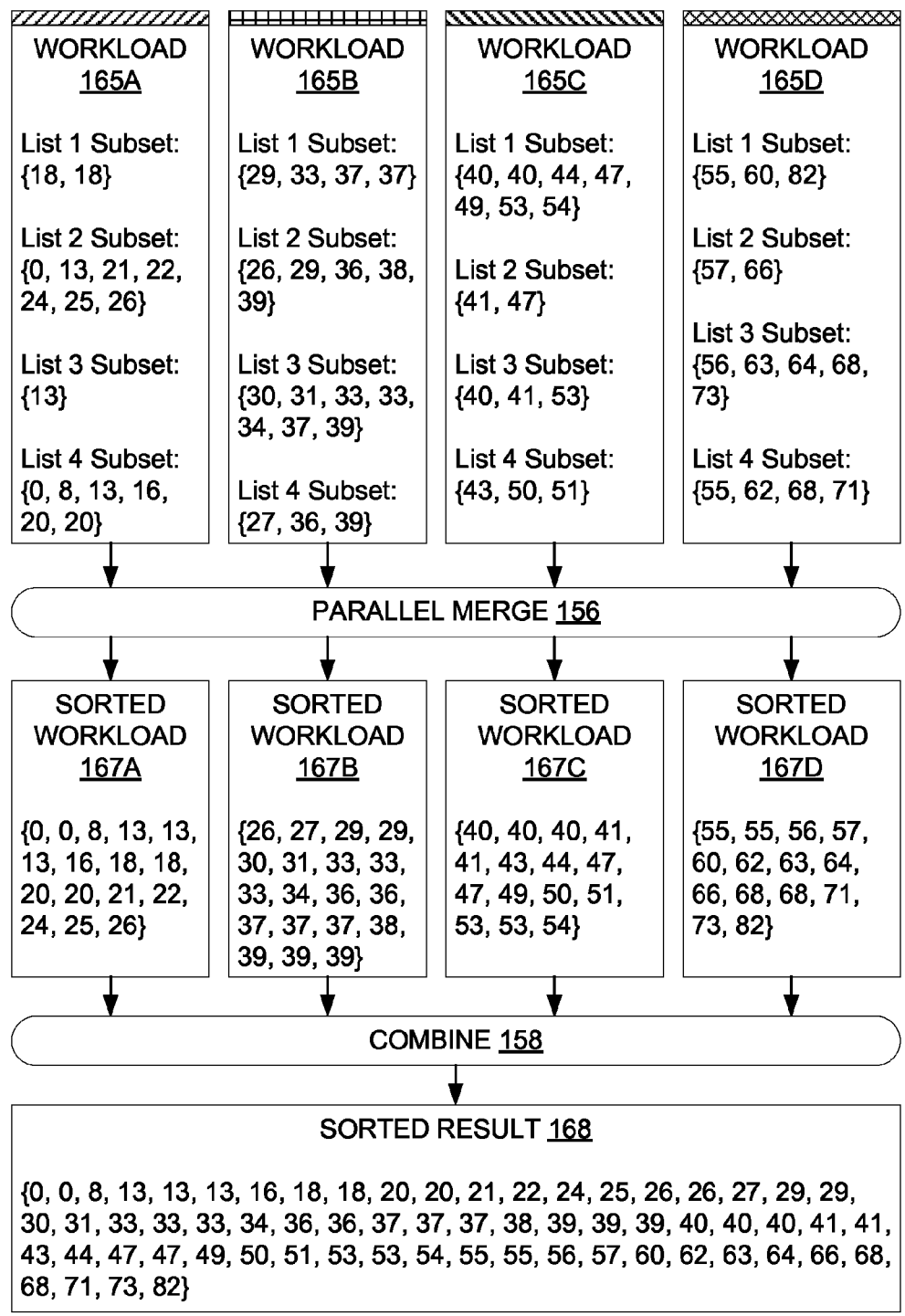
FIG. 2G is a block diagram that depicts a process for parallel merging and combining the N balanced workloads of FIG. 2C, according to an embodiment.

At block 208 of process 200, referring to FIG. 1, server node 120 sorts each of the N balanced workloads 164 in parallel. Referring to FIG. 2G, FIG. 2G is a block diagram that depicts a process for parallel merging and combining the N balanced workloads 164, according to an embodiment. FIG. 2G includes parallel merge 157, combine 158, workload 165A, workload 165B, workload 165C, workload 165D, sorted workload 167A, sorted workload 167B, sorted workload 167C, sorted workload 167, and sorted result 168. With respect to FIG. 2G, workloads 165A-165D may correspond to workloads 165A-165D from FIG. 2C, sorted workloads 167A-167D may correspond to sorted workloads 166 from FIG. 1, and numbered elements may correspond to like numbered elements from FIG. 1.

As shown in FIG. 2G and FIG. 1, workloads 165A-165D are sorted by parallel merge 156 using respective threads 134A-134D to output sorted workloads 167A-167D, which may correspond to sorted workloads 166 of FIG. 1. Since the subsets within each workload 165A-165D are already sorted with respect to each subset, the second phase using parallel merge 156 may utilize a faster sorting algorithm compared to the first phase using parallel sort 152. For example, parallel merge 156 may utilize a method that takes advantage of the ordered properties of the subsets in each workload, such as by utilizing a K-way mergesort or a 2-way mergesort.

Combining the Sorted Workloads

At block 210 of process 200, referring to FIG. 1, server node 120 combines the sorted workloads 166 to output sorted result 168. Referring to FIG. 2C, each successive workload of workloads 165A-165D includes adjacent value ranges without any overlap (besides the edge bounding values). Accordingly, the sorted workloads 167A-167D will also have this property of non-overlapping adjacent value ranges. As a result, combine 158 may use a simple concatenation of sorted workloads 166, or sorted workloads 167A-167D, to generate the final sorted result 168, as shown in FIG. 2G. The sorted result 168 may then be returned to application 112 to answer the original SQL SELECT query, duly sorted according to the GROUP BY clause. Application 112 may utilize sorted result 168 to output to a display, to create an output file or report, or to use for further processing and analysis.

Process 200 is thus complete, with the most time consuming steps of parallel sort 152 and parallel merge 156 carried out fully in parallel. An optimized utilization of all available threads is achieved regardless of the particular data distribution or skew of unsorted data elements 160 by ensuring approximately equal workloads, or unordered lists 161 and balanced workloads 164, for each respective parallel processing step, or parallel sort 152 and parallel merge 156. Additionally, the other steps of split 151, split point converge 154, and combine 158 can be carried out quickly without any expensive data scan operations. Thus, process 200 can provide efficient scaling for the massive number of elements and the large amount of threads demanded by the most data intensive applications, such as enterprise grade databases.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving K sorted lists, wherein M represents a number of elements in each of the K sorted lists, wherein K exceeds 1 and M exceeds 1;
    defining, for N workloads, a target size range that does not exceed a predetermined threshold from a target size of KM/N, wherein N exceeds 1;
    for each particular workload of the N workloads, performing a plurality of iterations to converge a size of said each particular workload towards the target size range, wherein for each iteration of said plurality of iterations:
        determining that said each particular workload comprises, from each of the K sorted lists, a respective subset that is bounded by a respective index range, wherein said each iteration selects a particular sorted list of the K sorted lists, wherein when said each iteration has a previous iteration, the determining includes:
            selecting, based on sizes of the respective subsets of the K sorted lists during the previous iteration, a particular sorted list of the K sorted lists, wherein the particular sorted list of said each iteration need not be the same as the particular sorted list of the previous iteration, and
            adjusting, based on the size, during the previous iteration, of the respective subset of said particular sorted list, the respective index range for the respective subset of said particular sorted list;
    sorting each of the N workloads in parallel; and
    combining the N workloads to output a sorted result;
    wherein the method is performed by one or more computing devices.

2. The method of claim 1, further comprising, prior to the receiving of the K sorted lists:
    receiving a request to sort a plurality of unsorted data elements;
    dividing the plurality of unsorted data elements approximately evenly into P unsorted lists, wherein P equals K; and
    sorting each of the P unsorted lists in parallel to provide the K sorted lists.

3. The method of claim 2, wherein the sorting of each of the P unsorted lists is by quicksort.

4. The method of claim 1, wherein the sorting of each of the N workloads is by K-way or 2-way merge sort.

5. The method of claim 1, wherein the sorting of each of the N workloads in parallel is performed by assigning each of the N workloads to a respective thread of a plurality of threads, and each thread of the plurality of threads executes on a respective processing core of a plurality of processing cores.

6. The method of claim 1, wherein the determining comprises:
    executing, for a particular workload of the N workloads:
        for each iteration in a converging process:
            if said each iteration is a first iteration, then select a particular list from the K sorted lists and select a candidate split point in the particular list as an first index M/N;
            if said each iteration is after the first iteration:
                select the particular list from the K sorted lists that has a first split point that is smallest of the K sorted lists if the size of said particular workload is smaller than the target size, or the particular list from the K sorted lists that has a second split point that is largest of the K sorted lists if the size of said particular workload is larger than the target size; and
                select the candidate split point in the particular list as a second index corresponding to a ceiling of $(i+M/N)/2$, wherein i is a third index of the split point in the particular list for the previous iteration;
            finding a split point for each of the K sorted lists other than the particular list, wherein values at indexes prior to each said split point do not exceed a candidate value at the candidate split point;
            summing a number of elements prior to the split point of each of the K sorted lists to determine the size of said particular workload;
            ending said converging process if the size of said particular workload is within the target size range; and
            ending said converging process if a maximum number of iterations is reached;
        defining a particular index range for each said subset of said particular workload as starting from a beginning offset and not exceeding the split point of each of the K sorted lists;
        moving the beginning offset to the split point for each of the K sorted lists.

7. The method of claim 6, wherein the executing is repeated for N−1 of the N workloads, and wherein a final workload of the N workloads defines the particular index range for each said subset of the final workload as starting from the beginning offset until a last element of each of the K sorted lists.

8. A non-transitory computer-readable medium storing one or more sequences of instructions which, when executed by one or more processors, cause:

receiving K sorted lists, wherein M represents a number of elements in each of the K sorted lists, wherein K exceeds 1 and M exceeds 1;

defining, for N workloads, a target size range that does not exceed a predetermined threshold from a target size of KM/N, wherein N exceeds 1;

for each particular workload of the N workloads, performing a plurality of iterations to converge a size of said each particular workload towards the target size range, wherein for each iteration of said plurality of iterations:

determining that said each particular workload comprises, from each of the K sorted lists, a respective subset that is bounded by a respective index range, wherein said each iteration selects a particular sorted list of the K sorted lists, wherein when said each iteration has a previous iteration, the determining includes:

selecting, based on sizes of the respective subsets of the K sorted lists during the previous iteration, a particular sorted list of the K sorted lists, wherein the particular sorted list of said each iteration need not be the same as the particular sorted list of the previous iteration, and adjusting, based on the size, during the previous iteration, of the respective subset of said particular sorted list, the respective index range for the respective subset of said particular sorted list;

sorting each of the N workloads in parallel; and combining the N workloads to output a sorted result.

9. The non-transitory computer-readable medium of claim 8, wherein the one or more sequences of instructions further cause performing of, prior to the receiving of the K sorted lists:

receiving a request to sort a plurality of unordered data elements;

dividing the plurality of unordered data elements approximately evenly into P unsorted lists, wherein P equals K; and sorting each of the P unsorted lists in parallel to provide the K sorted lists.

10. The non-transitory computer-readable medium of claim 9, wherein the sorting of each of the P unsorted lists is by quicksort.

11. The non-transitory computer-readable medium of claim 8, wherein the sorting of each of the N workloads is by K-way or 2-way merge sort.

12. The non-transitory computer-readable medium of claim 8, wherein the sorting of each of the N workloads in parallel is performed by assigning each of the N workloads to a respective thread of a plurality of threads, and each thread of the plurality of threads executes on a respective processing core of a plurality of processing cores.

13. The non-transitory computer-readable medium of claim 8, wherein the determining comprises:

executing, for a particular workload of the N workloads:

for each iteration in a converging process:

if said each iteration is a first iteration, then select a particular list from the K sorted lists and select a candidate split point in the particular list as an first index M/N;

if said each iteration is after the first iteration:

select the particular list from the K sorted lists that has a first split point that is smallest of the K sorted lists if the size of said particular workload is smaller than the target size, or the particular list from the K sorted lists that has a second split point that is largest of the K sorted lists if the size of said particular workload is larger than the target size; and select the candidate split point in the particular list as a second index corresponding to a ceiling of (i+M/N)/2, wherein i is a third index of the split point in the particular list for the previous iteration;

finding a split point for each of the K sorted lists other than the particular list, wherein values at indexes prior to each said split point do not exceed a candidate value at the candidate split point;

summing a number of elements prior to the split point of each of the K sorted lists to determine the size of said particular workload;

ending said converging process if the size of said particular workload is within the target size range; and ending said converging process if a maximum number of iterations is reached;

defining the particular index range for each said subset of said particular workload as starting from a beginning offset and not exceeding the split point of each of the K sorted lists;

moving the beginning offset to the split point for each of the K sorted lists.

14. The non-transitory computer-readable medium of claim 13, wherein the executing is repeated for N−1 of the N workloads, and wherein a final workload of the N workloads defines the particular index range for each said subset of the final workload as starting from the beginning offset until a last element of each of the K sorted lists.

15. A system comprising:

a plurality of processing cores on one or more server nodes, wherein each processing core of the plurality of processing cores executes a respective thread of a plurality of threads;

one or more processors configured to:

receive K sorted lists, wherein M represents a number of elements in each of the K sorted lists, wherein K exceeds 1 and M exceeds 1;

define, for N workloads, a target size range that does not exceed a predetermined threshold from a target size of KM/N, wherein N exceeds 1;

for each particular workload of the N workloads, performing a plurality of iterations to converge a size of said each particular workload towards the target size range, wherein for each iteration of said plurality of iterations:

determine that said each particular workload comprises, from each of the K sorted lists, a respective subset that is bounded by a respective index range, wherein said each iteration selects a particular sorted list of the K sorted lists, wherein when said each iteration has a previous iteration, the determining includes:

select, based on sizes of the respective subsets of the K sorted lists during the previous iteration, a particular sorted list of the K sorted lists, wherein the particular sorted list of said each iteration need not be the same as the particular sorted list of the previous iteration, and adjust, based on the size, during the previous iteration, of the respective subset of said particular sorted list, the respective index range for the respective subset of said particular sorted list;

sort each of the N workloads in parallel; and combine the N workloads to output a sorted result.

16. The system of claim 15, wherein the one or more processors are further configured, prior to the receiving of the K lists, to:

receive a request to sort a plurality of sorted data elements;

divide the plurality of sorted data elements approximately evenly into P unsorted lists, wherein P equals K; and sort each of the P unsorted lists using a respective thread of the plurality of threads in parallel to provide the K sorted lists.

17. The system of claim 16, wherein the sorting of each of the P unsorted lists is by quicksort.

18. The system of claim 15, wherein the sorting of each of the N workloads is by K-way or 2-way merge sort.

19. The system of claim 15, wherein the one or more processors are configured to determine the N workloads by:

executing, for a particular workload of the N workloads:

for each iteration in a converging process:

if said each iteration is a first iteration, then select a particular list from the K sorted lists and select a candidate split point in the particular list as an first index M/N;

if said each iteration is after the first iteration:

select the particular list from the K sorted lists that has a first split point that is smallest of the K sorted lists if the size of said particular workload is smaller than the target size, or the particular list from the K sorted lists that has a second split point that is largest of the K sorted lists if the size of said particular workload is larger than the target size; and select the candidate split point in the particular list as a second index corresponding to a ceiling of (i+M/N)/2, wherein i is a third index of the split point in the particular list for the previous iteration;

finding a split point for each of the K sorted lists other than the particular list, wherein values at indexes prior to each said split point do not exceed a candidate value at the candidate split point;

summing a number of elements prior to the split point of each of the K sorted lists to determine the size of said particular workload;

ending said converging process if the size of said particular workload is within the target size range; and ending said converging process if a maximum number of iterations is reached;

defining the particular index range for each said subset of said particular workload as starting from a beginning offset and not exceeding the split point of each of the sorted lists;

moving the beginning offset to the split point for each of the K sorted lists.

20. The system of claim 19, wherein the one or more processors are configured to repeat the executing for N−1 of the N workloads, and wherein a final workload of the N workloads defines the particular index range for each said subset of the final workload as starting from the beginning offset until a last element of each of the K sorted lists.

* * * * *